April 19, 1949.       J. E. MULHEIM       2,467,770
MOUNTING BRACKET
Filed Oct. 8, 1945

WITNESSES:
E. A. McClaskey
F. P. Lyle

INVENTOR
Joseph E. Mulheim.
BY O. B. Buchanan
ATTORNEY

Patented Apr. 19, 1949

2,467,770

UNITED STATES PATENT OFFICE 2,467,770

MOUNTING BRACKET

Joseph E. Mulheim, Lima, Ohio, assignor to Westinghouse Electric Corporation, East Pittsburgh, Pa., a corporation of Pennsylvania Application October 8, 1945, Serial No. 621,082

4 Claims. (Cl. 171—252)

The present invention relates to mounting brackets and, more particularly, to a bracket construction for engine-driven devices, such as aircraft generators, which are mounted on, and driven by, internal combustion engines.

The invention is especially adapted for use with aircraft generators, and similar engine-driven devices, which are mounted directly on an internal combustion engine, but it is to be understood that the invention is not necessarily restricted to this particular application, and the new mounting bracket may be used for mounting a device of any type on a supporting structure, where similar problems are encountered.

Aircraft generators, which supply the electrical loads on aircraft, are usually mounted on a pad on a main engine of the airplane, and driven by a power take-off shaft geared to the engine crankshaft. In the usual arrangement, threaded studs are secured in the mounting pad, and the generator is held in position by nuts threaded on these studs. It is very desirable to make the distance from the mounting pad to the center of gravity of a generator, or other device, mounted in this manner as small as possible, because of the severe vibration to which the generator is subjected. Any reduction in this distance results in a corresponding reduction in the magnitude of the alternating stresses set up in the generator by the vibration. In an aircraft generator, the limit for reducing the distance between the mounting pad and the center of gravity may be taken as the distance from the end of the mounting studs to the ends of the generator field coils plus the necessary electrical and manufacturing clearances, since the other dimensions of the generator are largely fixed by other design considerations. It is desirable, therefore, to make this distance as short as possible, which requires a minimum axial length of the mounting bracket.

The limited space available for aircraft generators, and other accessories, mounted on an airplane engine also makes it desirable to keep the axial length of the mounting bracket as small as possible, since the size and, therefore, the output of the generator is limited by the available space, and a reduction in the length of the mounting bracket permits an increase in the length of the generator itself, with a corresponding increase in output, without exceeding the limits of the available space.

The limited space available for the generator also causes another difficult problem. As indicated above, these generators are usually secured to the engine by means of studs extending from the mounting pad, and nuts threaded on the studs. It is frequently necessary to remove a generator from its engine and replace it, and in order to do this with reasonable facility, the arrangement of the mounting bracket must be such that the mounting studs and nuts are readily accessible. The limited space available, however, has made it very difficult to provide reasonable access to the studs and nuts, and this problem has not been satisfactorily overcome in most of the bracket designs which have been used heretofore. Thus, with some brackets which have been used, it has required several hours to remove a generator and replace it, because of the difficulty of reaching the studs and nuts. This is obviously undesirable, especially in the case of generators for use on military aircraft, where speed of maintenance operations is of great importance. Thus, accessibility of the mounting studs and nuts is an important requirement in mounting brackets for aircraft generators, and similar devices. It is also necessary for the bracket to have sufficient strength and rigidity to withstand the severe vibration resulting from operation of the internal combustion engine on which it is mounted, since the bracket is the most critical part of the generator in this respect.

It will be apparent, therefore, that the provision of a suitable mounting bracket for aircraft generators is a very difficult problem, since the bracket must be kept to a minimum axial length, but must permit ready accessibility to the mounting studs and nuts, and must also provide sufficient strength and rigidity to withstand severe vibration. In addition to these requirements, the bracket, in common with all other types of aircraft equipment, must be of minimum weight. It will be obvious that these requirements are somewhat conflicting, and there has not been available heretofore a bracket design which has satisfactorily met all of these exacting requirements.

The principal object of the present invention is to provide a mounting bracket for a device to be mounted on a supporting structure by means of studs and nuts, which is of minimum axial length, and which permits ready accessibility to the mounting studs and nuts.

A further object of the invention is to provide a mounting bracket for aircraft generators, and similar engine-mounted devices, which is of minimum axial length to permit the center of gravity of the generator to be as close to the support as possible, and which provides for maximum accessibility to the mounting studs and nuts to permit ease of mounting and dismounting the device, but which is also very strong and rigid so as to withstand vibration.

A more specific object of the invention is to provide a mounting bracket for aircraft generators, and similar devices, which is of minimum axial length and of great rigidity, and which is designed so that the generator can be put into place over threaded mounting studs with nuts already in place on the studs, and secured in position merely by tightening the previously positioned nuts. The bracket also permits ready accessibility to the nuts for this tightening operation, so that the generator can easily be installed and removed.

Other objects and advantages of the invention will be apparent from the following detailed description, taken in connection with the accompanying drawing, in which.

Figure 1:
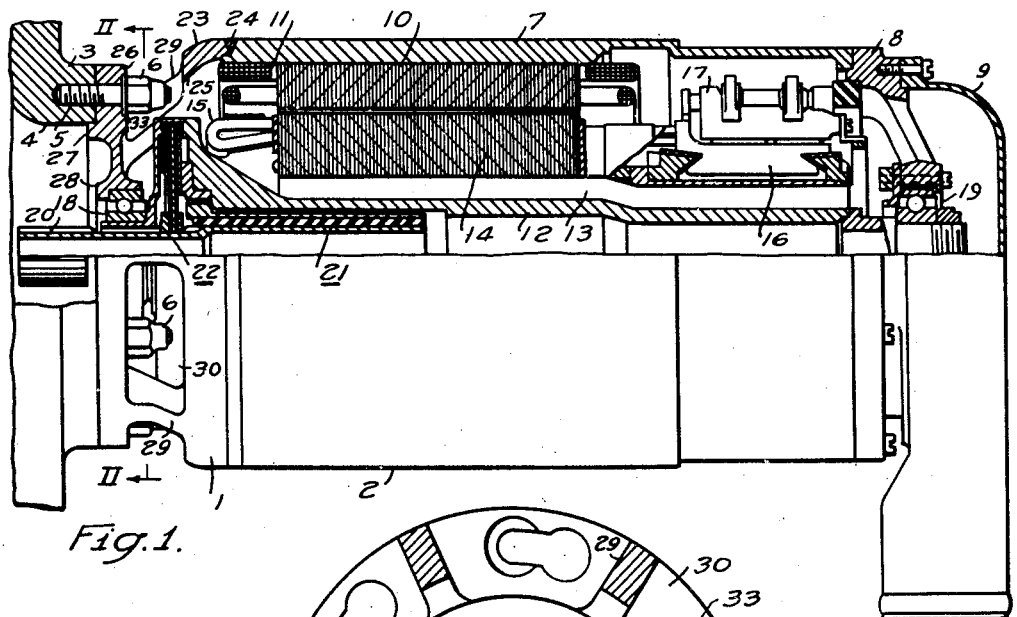
Figure 1 is a view, partly in side elevation and partly in longitudinal section, of an aircraft generator with a mounting bracket embodying the present invention, mounted in position on a mounting pad.

The invention is shown in the drawing as embodied in a mounting bracket 1 for an aircraft generator 2, which is adapted to be mounted on a mounting pad 3 on an airplane main engine. The pad 3 is shown as being annular, with a central opening 4 through which connection may be made to a power take-off shaft (not shown). The pad 3 is provided with threaded studs 5 which are permanently secured in the pad, so that the generator may be attached by means of nuts 6 threaded on the studs.

The generator shown in the drawing for the purpose of illustration includes a frame member 7, which is closed at one end by the mounting bracket 1, and at the other end by a bracket 8 of any suitable construction. An air shield 9 is preferably attached over the bracket 8 for connection to a blast tube, or other suitable source of cooling air. Pole pieces 10 are secured in the frame 7, and suitable field windings 11 are placed on the pole pieces 10. The armature of the generator includes a hollow shaft 12 having a plurality of radial ribs 13. The laminated armature core 14 is supported on the ribs 13 and carries a suitable armature winding 15, which is connected to a commutator 16 also supported on the ribs 13. Suitable brush rigging 17 is mounted on the bracket 8 with brushes engaging the commutator 16.

The armature shaft 12 is supported in ball bearings 18 and 19, which are mounted in the brackets 1 and 8, respectively. The shaft 12 is driven by means of a short drive shaft 20, which is adapted for a splined connection to the power take-off shaft of the engine, and which is connected to the armature shaft 12 by means of a resilient coupling 21 to absorb the torsional vibration of the internal combustion engine. Damping means 22 are preferably also provided to damp the torsional vibration. The flexible coupling 21 and damping means 22 may be of any suitable type, and have been shown as being of the type more specifically described and claimed in my copending application, Serial No. 621,083, filed October 8, 1945, and assigned to Westinghouse Electric Corporation.

The mounting bracket 1, to which the present invention is particularly directed, may be made of steel, and has a generally circular rim portion 23, which is adapted to be secured to the frame 7 of the generator in any suitable manner, as by welding or brazing, as indicated at 24. The rim portion 23 is curved inwardly in the axial direction, so that its inner edge 25 extends down over the field windings 11 to protect the windings when the generator is being mounted in position. The bracket 1 also includes a radial flange portion 26 which is adapted to fit on the pad 3, and which may have an annular shoulder 27 to engage the inner periphery of the pad to accurately center the generator on the pad. The flange portion 26 also has a central hub portion 28 in which the bearing 18 is supported.

The rim portion 23 and flange portion 26 of the mounting bracket 1 are joined together by a plurality of integral, longitudinal ribs 29 which are spaced apart around the circumference of the bracket so as to leave large, unobstructed openings 30 between the ribs. It will be noted that the ribs 29 are relatively thin in the circumferential direction, but are quite deep radially, so as to provide great strength and rigidity in the direction of the vibratory stresses to which the bracket is subjected in service, but without requiring an excessive amount of material. This construction, therefore, gives the bracket great rigidity but permits the weight to be kept low, since the material is used in the most economical manner.

Figure 2:
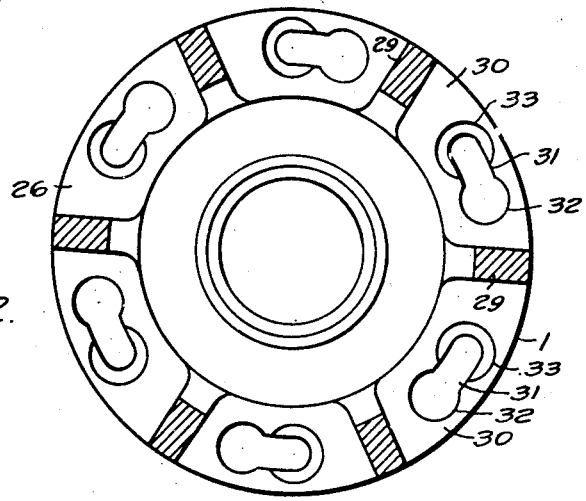
Fig. 2 is a transverse sectional view of the bracket, approximately on the line II—II of Fig. 1.

The number of ribs 29 is equal to the number of mounting bolts 5, and the flange 26 has openings 31 in the spaces between the ribs for the reception of the bolts 5. As clearly shown in Fig. 2, the openings 31 are elongated, arcuate openings which are just wide enough to permit the bolts 5 to pass through. One end of each of the openings 31 is enlarged, as indicated at 32, to a size large enough to permit passage of the mounting nuts 6. At the opposite end of each of the openings 31, a recess 33 is provided, as by counterboring, to form a seat for a nut 6.

In mounting the generator in position on the mounting pad 3, the nuts 6 are first threaded on the studs 5 far enough to leave just sufficient clearance between the nuts and the pad for the flange portion 26 of the bracket 1. The generator is then placed in position by placing the flange portion 26 of the bracket 1 over the studs 5 and nuts 6, the nuts passing through the enlarged portions 32 of the elongated openings 31. The generator is then rotated to bring the studs to the other ends of the openings 31, and the nuts 6 are tightened down into the counterbored recesses 33, which form seats for the nuts. In this way, the generator is accurately positioned in the desired angular position, which is necessary to insure that the terminals of the generator, and the air shield 9, will be in the proper position to permit connection of the electrical leads and the blast tube. In placing the generator in position in this manner, the inner periphery 25 of the rim portion of the bracket 1 protects the field coils 11 from damage, which might be caused by the nuts 6 if they were only partly threaded on the studs, and if no protection were provided for the field coils. The nuts 6 are readily accessible for tightening by means of an ordinary wrench through the large openings 30, and thus the generator can be mounted in position, or dismounted, very easily in spite of the limited space available.

Figure 3:
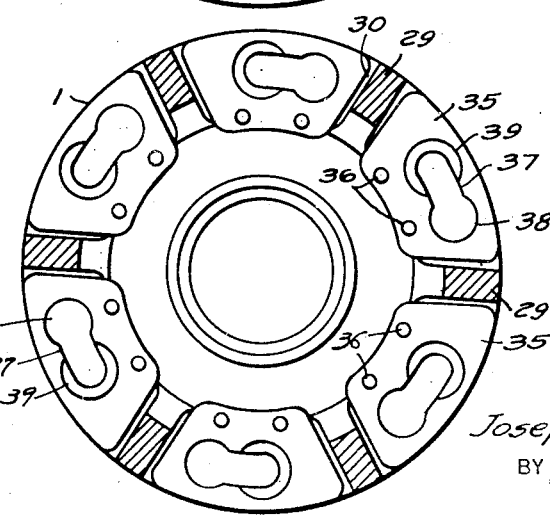
Fig. 3 is a transverse sectional view, similar to Fig. 2, showing a slightly modified embodiment of the invention.

In order to keep the weight to a minimum, it may sometimes be desirable to make the bracket 1 of a magnesium or aluminum alloy, rather than of steel. When a soft material such as magnesium or aluminum is used, the nuts 6 would tend to dig into the flange portion 26 when tightened down, and, to prevent this, the construction shown in Fig. 3 may be utilized. The construction of the bracket shown in this figure is identical with that previously described, with the addition of steel plates 35 secured to the inner surface of the flange portion 26 in the spaces 30 between the ribs 29. The plates 35 may be secured to the flange portion by any suitable means, such as rivets 36, and are provided with elongated openings 37, coinciding with the openings 31 in the bracket itself, and having enlarged portions 38 at one end coinciding with the enlarged portions 32 of the bracket openings. Counterbored recesses 39 are provided in the plates 35 to form seats for the nuts 6 to accurately position the generator, as previously described. Thus, the modification of Fig. 3 differs from the construction previously described only in the use of the steel plates 35 to prevent the nuts 6 from digging into the bracket when a soft material such as magnesium or aluminum is used.

It should now be apparent that a mounting bracket has been provided for aircraft generators, or other engine-mounted devices, which meets the exacting requirements for a device of this type in a very satisfactory manner. The axial length of the new bracket is considerably less than has been attainable with any previously used aircraft generator bracket design, thus permitting the center of gravity of the generator to be as close as possible to the mounting pad to reduce the vibratory stresses in the generator. The construction of the bracket is such that the mounting studs and nuts are readily accessible, and the generator is easily put in place on the studs and secured in position merely by tightening the nuts, which have previously been threaded on the studs, and which are readily accessible through the large openings between the ribs of the bracket, so that they can be tightened by means of an ordinary wrench, thus avoiding the necessity for special tools. The bracket has great strength and rigidity so that it can withstand severe vibratory stresses, and its weight can be kept quite low.

The invention has been described with particular references to aircraft generators, but it is to be understood that the new bracket may be used for other engine-mounted devices or, in general, for any device which is to be mounted on a supporting structure by means of a bracket. A specific embodiment of the invention has been shown and described for the purpose of illustration, but it will be apparent that various modifications might be made within the scope of the invention, and it is to be understood, therefore, that the invention is not limited to the specific details of construction shown, but in its broadest aspects it includes all equivalent modifications and embodiments which come within the scope of the appended claims.

I claim as my invention:

1. In a dynamoelectric machine adapted to be mounted on and driven by an internal combustion engine, said machine having a stator member and a rotor member, said stator member having windings thereon, a mounting bracket for said machine, said bracket having a generally circular rim portion secured to said stator member, said rim portion being curved in the axial direction to extend radially inward over said stator windings, a radial flange portion spaced from the rim portion, and a plurality of longitudinal ribs joining the rim portion and the flange portion, said ribs being spaced apart circumferentially of the bracket to leave open spaces therebetween, and said flange portion having elongated, arcuate openings therein in the spaces between the ribs for the reception of mounting studs, each of said arcuate openings having an enlarged portion to permit passage therethrough of a mounting stud with a nut in place thereon.

2. In a dynamoelectric machine adapted to be mounted on and driven by an internal combustion engine, said machine having a stator member and a rotor member, said stator member having windings thereon, a mounting bracket for said machine, said bracket having a generally circular rim portion secured to said stator member, said rim portion being curved in the axial direction to extend radially inward over said stator windings, a radial flange portion spaced from the rim portion, and a plurality of longitudinal ribs joining the rim portion and the flange portion, said ribs being relatively deep radially and relatively thin circumferentially and being spaced apart circumferentially of the bracket to leave open spaces therebetween, said flange portion having elongated, arcuate openings therein in the spaces between the ribs for the reception of mounting studs, each of said arcuate openings having an enlarged portion to permit passage of a stud with a nut in place therein, and each of said arcuate openings having a seat for a nut.

3. In a machine adapted to be mounted on and driven by a prime mover which is subject to vibration, a mounting bracket for said machine, said bracket having a generally circular rim portion secured to the machine, a generally radial flange portion spaced from the rim portion and adapted to engage a mounting surface on the prime mover, a plurality of generally axial ribs joining said rim and flange portions, said ribs being relatively deep radially to have sufficient strength to withstand vibration and being relatively thin circumferentially, the ribs being spaced apart circumferentially of the bracket to provide substantially unobstructed open spaces between the ribs, and said flange portion having elongated, arcuate openings therein for the reception of mounting studs, each of said arcuate openings having an enlarged portion to permit passage of a stud with a nut in place thereon.

4. In a machine adapted to be mounted on and driven by a prime mover which is subject to vibration, a mounting bracket for said machine, said bracket having a generally circular rim portion secured to the machine, a generally radial flange portion spaced from the rim portion and adapted to engage a mounting surface on the prime mover, a bearing for a rotating part of the machine supported in the flange portion, a plurality of generally axial ribs joining said rim and flange portions, said ribs being relatively deep radially to have sufficient strength to withstand vibration and being relatively thin circumferentially, the ribs being spaced apart circumferentially of the bracket to provide substantially unobstructed open spaces between the ribs, and said flange portion having elongated, arcuate openings therein for the reception of mounting studs, each of said arcuate openings having an enlarged portion to permit passage of a stud with a nut in place thereon.

JOSEPH E. MULHEIM.

REFERENCES CITED

The following references are of record in the file of this patent:

UNITED STATES PATENTS

| Number | Name | Date |
|---|---|---|
| 801,383 | King | Oct. 10, 1905 |
| 1,435,400 | Layne | Nov. 14, 1922 |
| 1,714,484 | Johnson | May 21, 1929 |
| 1,745,547 | Layne | Feb. 4, 1930 |
| 1,766,254 | Kearney | June 24, 1930 |
| 1,802,964 | Brady | Apr. 28, 1931 |
| 2,139,379 | Myers | Dec. 6, 1938 |
| 2,197,728 | Lee | Apr. 16, 1940 |
| 2,377,415 | Guignon | June 5, 1945 |
| 2,430,422 | Happe | Nov. 4, 1947 |